United States Patent
Yamaguchi et al.

[11] Patent Number: 6,066,273
[45] Date of Patent: May 23, 2000

[54] AXIAL REFRACTIVE INDEX DISTRIBUTED LENS

[75] Inventors: Jun Yamaguchi; Shigeo Kittaka; Yoshinori Shiotani, all of Osaka, Japan

[73] Assignee: Nippon Sheet Glass Co., Ltd., Osaka, Japan

[21] Appl. No.: 09/193,719

[22] Filed: Nov. 17, 1998

[30] Foreign Application Priority Data

Nov. 20, 1997 [JP] Japan .................................. 9-319843

[51] Int. Cl.[7] .................. F21V 9/14; C03C 15/00; G02B 3/00
[52] U.S. Cl. .................. 252/585; 252/584; 65/30.13; 359/653
[58] Field of Search .................. 252/584, 585; 65/30.13; 428/212; 359/653

[56] References Cited

U.S. PATENT DOCUMENTS

| | | |
|---|---|---|
| 3,873,408 | 3/1975 | Hensler . |
| 4,756,733 | 7/1988 | Houde-Walter et al. . |
| 4,902,330 | 2/1990 | Sakai et al. .................. 65/30.13 |
| 4,952,037 | 8/1990 | Oikawa et al. . |
| 4,971,423 | 11/1990 | Nakata et al. . |
| 5,004,707 | 4/1991 | Ross et al. . |
| 5,139,557 | 8/1992 | Kittaka et al. . |
| 5,837,023 | 11/1998 | Koike et al. .................. 65/30.13 |

FOREIGN PATENT DOCUMENTS

| | | |
|---|---|---|
| 0 447 678 A1 | 9/1991 | European Pat. Off. . |
| 38 03 420 A1 | 8/1989 | Germany . |
| 61-261238 | 11/1986 | Japan . |
| 62-100451 | 5/1987 | Japan . |

*Primary Examiner*—Philip Tucker
*Attorney, Agent, or Firm*—Sughrue, Mion, Zinn, Macpeak & Seas, PLLC

[57] ABSTRACT

An excellent axial refractive index distributed lens is disclosed, which has a refractive index distribution required for an optical design, high durability, and high quality (a low melting temperature) and is obtained, by an ion exchange method using silver, from a glass material having the following composition:

$10 < Na_2O \leq 25$ mol %
$8 < Al_2O_3 \leq 25$ mol %
$0 \leq MgO \leq 18$ mol %
$0 \leq ZnO \leq 18$ mol %
$3 \leq B_2O_3 \leq 18$ mol %
$35 \leq SiO_2 \leq 55$ mol %
$0 \leq La_2O_3 \leq 5$ mol %
$0 \leq BaO \leq 5$ mol %
$0 \leq Ta_2O_5 \leq 3$ mol %
$0 \leq ZrO_2 \leq 3$ mol % provided that $2.5 \leq MgO+ZnO \leq 18$ mol %.

The glass composition constituting the glass material has an ion exchange rate sufficient for practical use and is capable of allowing silver ions to be stably present therein.

7 Claims, 7 Drawing Sheets

EXAMPLE 1

DISTANCE FROM GLASS SURFACE

EXAMPLE 1

Z: DISTANCE FROM GLASS SURFACE (mm)

AXIAL REFRACTIVE INDEX DISTRIBUTED LENS

FIELD OF THE INVENTION

The present invention relates to an axial refractive index distributed lens, in which the refractive index linearly changes in a direction of an optical axis. More particularly, this invention relates to an axial refractive index distributed lens obtained by forming a refractive index distribution in the direction of the optical axis by an ion exchange method using silver.

BACKGROUND OF THE INVENTION

A single lens which is made of glass or plastic material having a homogeneous refractive index and which has spherical or flat surfaces is incapable of correcting the spherical aberration on the optical axis. Although lenses having an aspherical surface is capable of correcting the spherical aberration, such aspherical lenses have problems that molds used for press-molding those lenses have a high production cost and that grinding marks remained on the mold surface are transferred to the lens surface.

Another way to correct spherical aberration is to use an axial refractive index distributed lens. FIGS. 1(a) and (b) are a sectional view diagrammatically showing a planoconvex condenser lens 1 with an axial gradient refractive index distribution and a graph showing the gradient refractive index distribution thereof, respectively.

The axial refractive index distributed lens 1 gives a refractive index distribution R in the direction of the optical axis L thereof and has a uniform refractive index within the plane perpendicular to the optical axis. The refractive index distribution in the spherical surface part is linear and has a specific slope according to the radius of curvature, whereby the spherical aberration can be satisfactorily corrected. Lenses having a larger numerical aperture (NA), i.e., lenses which are brighter, should have a larger difference in refractive index within the linear part. Whether or not the spherical surface part outside the area of the effective diameter D has a refractive index distribution has almost no influence on spherical aberration. As compared with aspherical lenses, this axial refractive index distributed lens has an advantage that grinding and polishing are easy, because the lens surface may be spherical or may remain flat.

A preferred method for producing the axial refractive index distributed lens is a method as described below.

As shown in FIG. 2, a flat glass plate 5 having a uniform refractive index is provided, and this glass plate is immersed in a molten salt 6, e.g., a nitrate or sulfate. Ion exchange occurs between the glass plate 5 and the molten salt 6 by diffusion, into the glass plate 5, ions which contribute to the change of refractive index toward the deep inner part from the glass surface. A refractive index distribution which gradually decreases or increases toward the deep inner part of the glass from the surface thereof is formed in the glass plate 5. A part of the glass plate which contains the refractive index distribution is cut out and ground and polished to make an axial refractive index distributed lens.

In the above ion exchange process for producing the axial refractive index distributed lens, it is most suitable to use thallium ions as ions which contribute to a refractive index distribution in order to obtain a large refractive index difference. The molten salt used in this embodiment is a molten salt comprising a thallium salt such as $TlNO_3$ or $Tl_2SO_4$.

However, since thallium is highly toxic, glasses containing a large amount of thallium and the use of a molten salt containing a large amount of thallium pose a problem from the standpoint of environmental pollution.

Another possible ions which contribute to a large refractive index difference are silver ions as shown in JP-A-61-261238 and JP-A-62-100451. (The term "JP-A" as used herein means an "unexamined published Japanese patent application".) Since silver ions generally tend to form a colloid, a glass composition containing phosphorus oxide in a large amount so as to inhibit the colloid formation of silver ions is proposed in the above JP-A references.

However, glasses containing a large amount of phosphorus oxide have poor weather resistance and hence pose a problem in practical use. Glasses containing a large amount of phosphorus oxide have another problem that the glasses react with a nitric acid salt during ion exchange process to form a devitrification product on the glass surface or the glasses dissolve in the molten salt. Using a molten salt other than nitric acid salts, e.g., a molten salt of a sulfuric acid salt or a halide, has many problems, for example, that such a molten salt highly corrodes metals and glasses and it is hence difficult to select an appropriate container for the molten salt.

Improvements of the glass composition shown in JP-A-62-100451 include the glass composition described in JP-A-4-2629. This glass composition also is insufficient in stability in molten salts and durability of the glass material, and hence has a problem in practical use.

On the other hand, an aluminosilicate glass is known as a glass composition which does not contain phosphorus oxide and in which silver ions do not form a colloid. In general, when alkali ions are incorporated into a silicate glass, the silicate framework is cut and non-bridging oxygens (hereinafter referred to as "NBO") strongly bonded to alkali ions are formed. If silver ions are incorporated by ion exchange into a glass in which NBO is present, the silver ions incorporated are reduced by the action of NBO to form a silver colloid, which colors the glass. The resulting colored glass cannot be used as a lens. In contrast, when $Al_2O_3$ is added to a silicate glass, the $Al_2O_3$ is incorporated in the form of $AlO_4^-$, which combines with an alkali to reduce the amount of NBO in the glass. As a result, silver ions tend to be present stably in the ion form. Since $AlO_4^-$ ions combine with alkali ions in a ratio of 1:1, the amount of NBO in the glass is the smallest (or is zero in some glasses) when [M]/[Al]=1 ([M] and [Al] represent a molar concentration of alkali ions and $AlO_4^-$ ions, respectively, in the glass). Consequently, an aluminosilicate glass in which [M]/[Al]=1 can most stably contain silver ions therein.

Incidentally, in order to obtain the axial refractive index distributed lens with larger NA, it is necessary to make the axial refractive index difference large. To attain this it is necessary to use a glass containing a large amount of alkali ions to be replaced with silver ions, because the refractive index difference is approximately proportional to the silver ion concentration. In order to enable silver ions to be present stably in an aluminosilicate glass for the above purpose, it is necessary to increase the concentration of $Al_2O_3$ as the alkali concentration in the glass increases. However, the melting temperature of a glass elevates if the $Al_2O_3$ concentration in the glass increases. As a result, it is difficult to produce a glass having preferable quality (free from striae, bubbles, etc.). In order to lower the melting temperature, it is considered to decrease the $Al_2O_3$ concentration in the glass. However, the amount of silver ions which can be contained in this glass without forming a colloid is decreased, so that a large refractive index difference cannot be obtained.

It is also known that the melting point of a glass can be lowered without formation of colloid of silver ions by incorporating $B_2O_3$ into the glass (*Glastech. Ber.*, 64 [8] 199 (1991), *Appl. Opt*, 31 [25] 5221 (1992), and *J. Non-Cryst. Solids*, 113 37 (1989); in glasses, boron has a valence of 3 like aluminum). However, too high $B_2O_3$ concentration in a glass poses problems that durability of the glass deteriorates and a rate of silver ion exchange is decreased. Therefore, the concentration of $B_2O_3$ which can be incorporated is limited.

Thus, an axial refractive index distributed lens having a large axial refractive index difference and high quality, thus having sufficiently satisfactory properties, has not been provided so far.

SUMMARY OF THE INVENTION

The present invention has been made to overcome the conventional problems described above.

An object of the present invention is to provide an excellent axial refractive index distributed lens which has a refractive index distribution required for an optical design, high durability, and high quality, i.e., a glass of a low melting temperature, and is obtained from a glass composition which has an ion exchange rate sufficient for practical use and enables silver ions to be stably present therein.

The present invention provides an axial refractive index distributed lens obtained by forming a refractive index distribution in a glass material in the direction of an optical axis thereof by an ion exchange method using silver, the glass material comprising a glass composition having the following components:

$10 < Na_2O \leq 25$ mol %
$8 < Al_2O_3 \leq 25$ mol %
$0 \leq MgO \leq 18$ mol %
$0 \leq ZnO \leq 18$ mol %
$3 \leq B_2O_3 \leq 18$ mol %
$35 \leq SiO_2 \leq 55$ mol %
$0 \leq La_2O_3 \leq 5$ mol %
$0 \leq BaO \leq 5$ mol %
$0 \leq Ta_2O_5 \leq 3$ mol %
$0 \leq ZrO_2 \leq 3$ mol %
provided that
$2.5 \leq MgO + ZnO \leq 18$ mol %.

The present invention makes it possible to lower the melting temperature of the glass while maintaining high durability, by incorporating MgO and ZnO into an aluminoborosilicate glass. Silver ions are stably incorporated in their ionized state into the glass to thereby realize the axial refractive index distributed lens having a necessary refractive index distribution.

It is generally known that bivalent ions considerably decrease the diffusion rate of univalent ions. However, of bivalent ions, MgO and ZnO are polyvalent ions which do not relatively decrease the ion exchange rate (R. H. Doremus, "Glass Science 2nd." p. 278, John Wiley & Sons). It has been reported that these magnesium and zinc ions are polyvalent ions having the possibility of diminishing NBO in glasses (*Appl. Opt.*, 31 [25] 5221 (1992)). However, no report has been made so far on the actual production of an axial refractive index distributed lens of a glass containing MgO and ZnO.

It has been found that the object of the present invention can be accomplished by incorporating MgO and ZnO into an aluminoborosilicate glass as glass compositions of a glass material for the axial refractive index distributed lens. The present invention has been completed based on this finding.

In the present invention, the glass composition preferably has the following components:

$12.5 \leq Na_2O \leq 25$ mol %
$10 \leq Al_2O_3 \leq 22$ mol %
$0 \leq MgO \leq 15$ mol %
$0 \leq ZnO \leq 15$ mol %
$5 \leq B_2O_3 \leq 16$ mol %
$40 \leq SiO_2 \leq 55$ mol %
$0 \leq La_2O_3 \leq 3$ mol %
$0 \leq BaO \leq 3$ mol %
$0 \leq Ta_2O_5 \leq 3$ mol %
$0 \leq ZrO_2 \leq 3$ mol %
provided that
$3 \leq MgO + ZnO \leq 15$ mol %.

The glass composition in the present invention more preferably has the following components:

$12.5 \leq Na_2O \leq 18$ mol %
$12.5 \leq Al_2O_3 \leq 18$ mol %
$0 \leq MgO \leq 12.5$ mol %
$0 \leq ZnO \leq 12.5$ mol %
$7 \leq B_2O_3 \leq 15$ mol %
$42.5 \leq SiO_2 \leq 52.5$ mol %
$0 \leq La_2O_3 \leq 3$ mol %
$0 \leq BaO \leq 3$ mol %
$0 \leq Ta_2O_5 \leq 3$ mol %
$0 \leq ZrO_2 < 3$ mol %
provided that
$5 \leq MgO + ZnO \leq 12.5$ mol %.

In the glass composition, a ratio of the concentration of $Al_2O_3$ to that of $Na_2O$, $[Al_2O_3]/[Na_2O]$, is desirably from 0.8 to 1.2.

Figure 1:
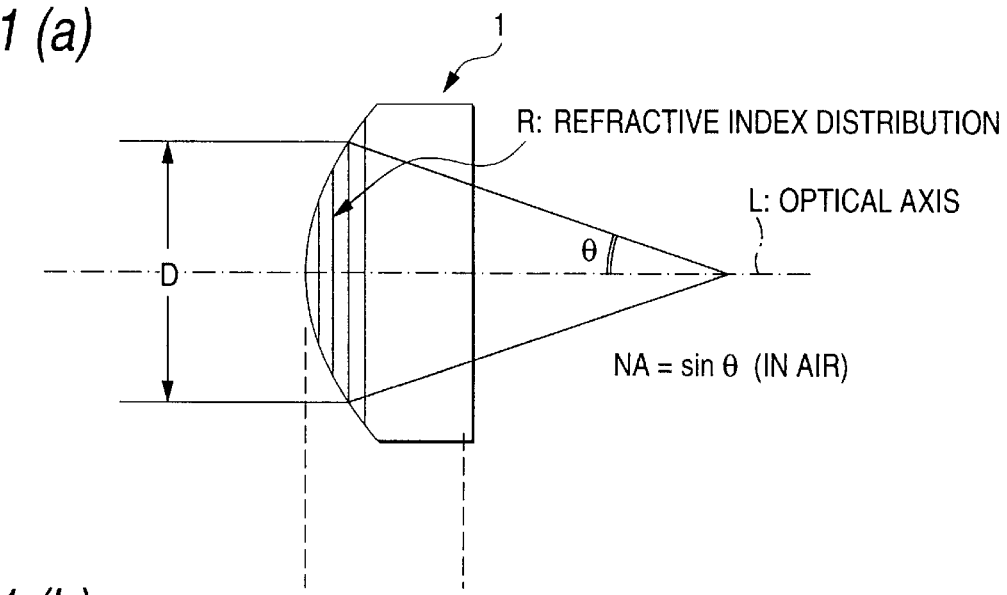
FIG. 1(*a*) is a diagrammatic sectional view showing the axial refractive index distributed lens, and FIG. 1(*b*) is a graph showing the refractive index distribution of the lens.
Figure 1:
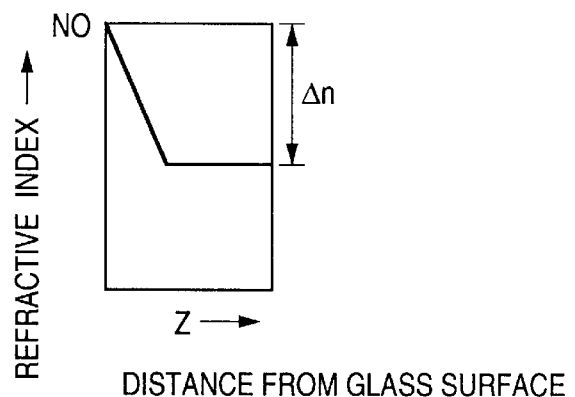
Figure 2:
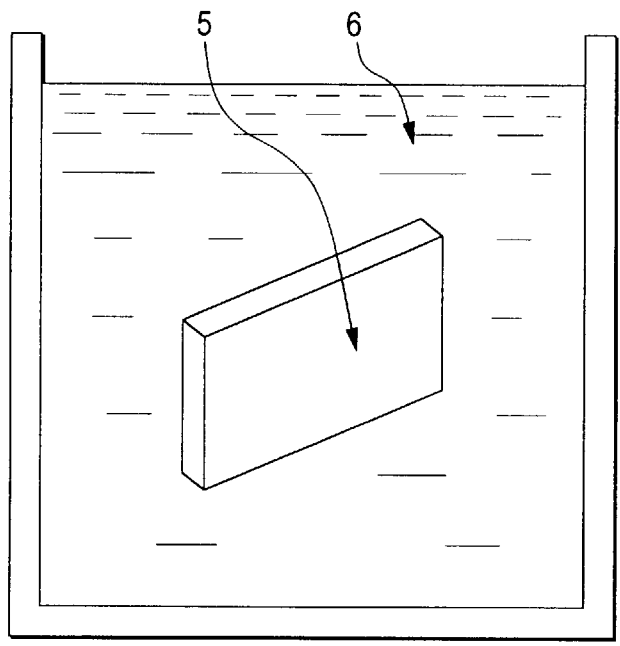
FIG. 2 is a diagrammatic view showing a method for producing a glass plate having a refractive index distribution by ion exchange.

1: Condenser lens
5: Glass plate
6: Molten salt

DETAILED DESCRIPTION OF THE INVENTION

The present invention will be described in detail below.

The glass composition constituting the glass material used in the present invention is explained.

If the total concentration of MgO and ZnO in the glass composition is lower than 2.5 mol %, the effect is not sufficient to lower the melting temperature of the glass and obtain a glass having good quality. If the total concentration thereof exceeds 18 mol %, stability of silver ions in the glass having such a composition becomes too low, which is not practical. Therefore, the concentration of MgO+ZnO is $2.5 \leq MgO+ZnO \leq 18$ mol %, preferably $3 \leq MgO+ZnO \leq 15$ mol %, and more preferably $5 \leq MgO+ZnO < 12.5$ mol %. MgO and ZnO may be used alone or as a mixture thereof.

The optimal alkali ions which are replaced with silver ions for forming a refractive index distribution are sodium ions because silver ions have a large interdiffusion coefficient with sodium ions and have a short ion exchange time. If the concentration of sodium ions is 10 mol % or lower, the necessary difference in refractive index cannot be obtained. If the concentration thereof exceeds 25 mol %, the glass has poor durability, causing problem on practical use. Therefore, the concentration of $Na_2O$ is $10<Na_2O \leq 25$ mol %, preferably $12.5 \leq Na_2O \leq 25$ mol %, and more preferably $12.5 \leq Na_2O < 18$ mol %.

$Al_2O_3$ is an essential component to enable the glass to stably contain silver ions. As described above, [Na]/[Al] is desirably 1 in order to eliminate NBO in glass. The present invention however makes it possible to stably contain silver ions in the glass even if [Na]/[Al] is not 1, by introducing MgO and ZnO into a glass. However, since the effect is not so strong as in $Al_2O_3$, the concentration of $Al_2O_3$ in the glass is desirably 0.8 to 1.2 times that of $Na_2O$.

If $Al_2O_3$ is incorporated too much, melting temperature of such a glass composition is too high, making it difficult to produce a glass having good quality. Therefore, the concentration of $Al_2O_3$ is $8<Al_2O_3 \leq 25$ mol %, preferably $10 \leq Al_2O_3 \leq 22$ mol %, and more preferably $12.5 \leq Al_2O_3 \leq 18$ mol %.

$B_2O_3$ has an effect to lower the melting temperature of a glass, thereby making it easy to produce a glass having good quality and also to prevent occurrence of cracks due to ion exchange process. If the concentration of $B_2O_3$ is lower than 3 mol %, its effect is insufficient. If the concentration thereof exceeds 18 mol %, durability of the glass decreases, and problem arises in practical use. Therefore, the concentration of $B_2O_3$ is $3 \leq B_2O_3 \leq 18$ mol %, preferably $5 \leq B_2O_3 \leq 16$ mol %, and more preferably $7 \leq B_2O_3 \leq 15$ mol %.

$SiO_2$ is the major component for forming a network structure of the glass. If the concentration of $SiO_2$ is lower than 35 mol %, chemical durability of glass significantly decreases. If the concentration thereof exceeds 55 mol %, contents of oxides used for forming a refractive index distribution and other oxides are limited and the melting temperature becomes too high, thereby it is difficult to obtain a glass having good quality. For this reason, the concentration of $SiO_2$ is $35 \leq SiO_2 \leq 55$ mol %, preferably $40 \leq SiO_2 \leq 55$ mol %, and more preferably $42.5 \leq SiO_2 \leq 52.5$ mol %.

In the present invention, $La_2O_3$ and BaO can further be added to the glass composition in order to change the refractive index and dispersion of the glass material so as to increase a degree of freedom in lens design. However, if the concentration of $La_2O_3$ and BaO in the glass is too high, problems arise that the rate of silver/sodium ion exchange is too low and the glass suffers from phase separation. For this reason, the concentration of $La_2O_3$ and BaO each is 5 mol % or lower, and preferably 3 mol % or lower.

Like $La_2O_3$ and BaO, $Ta_2O_5$ can also be added to the glass composition in order to change the refractive index and dsipersion of the glass material. $Ta_2O_5$ decreases the rate of silver/sodium ion exchange less than $La_2O_3$ and BaO. However, if $Ta_2O_5$ concentration is too high, problem arises that the glass suffers from phase separation. For this reason, the concentration of $Ta_2O_5$ is 3 mol % or lower.

$ZrO_2$ can further be added in the present invention in order to improve durability of the glass. However, if the concentration of $ZrO_2$ in the glass is too high, problems arise that a melting temperature of the glass is too high and the rate of silver/sodium ion exchange is too low. For this reason, the concentration of $ZrO_2$ is 3 mol % or lower.

In the present invention, $Nb_2O_5$, $Sb_2O_3$, $WO_3$ and $Y_2O_3$ may be added in amounts of $0 \leq Nb_2O_5 \leq 3$ mol %, $0 \leq Sb_2O_3 \leq 1$ mol %, $0 \leq WO_3 \leq 1$ mol %, and $0 \leq Y_2O_3 \pm 1$ mol %, respectively, per 100 mol % of the major components described above so long as the incorporation of these ingredients does not impair the properties as a axial refractive index distributed lens.

The axial refractive index distributed lens according to the present invention can be easily produced from a glass material (which may have any shape such as a flat plate, cylindrical, spherical, or block shape) made of a glass composition having the components described above, by subjecting the glass material to ion exchange by, for example, immersing the same in a molten salt to diffuse silver ions into the glass material to thereby form a refractive index distribution, cutting the glass material into a given size, and then grinding and polishing the cut material.

Examples of the molten salt used above include a mixed molten salt of 5 to 30 mol % silver nitrate and 95 to 70 mol % sodium nitrate and a mixed molten salt of 50 to 100 mol % silver chloride, 0 to 50 mol % zinc chloride, and 0 to 30 mol % silver sulfide. However, the mixed molten salt containing silver nitrate is preferably used from the standpoint of corrosion prevention. Treatment conditions are appropriately selected according to the desired refractive index distribution, i.e., the desired amount of silver ions to be injected, in the temperature range of 300 to 420° C. for the mixed molten salt comprising silver nitrate and 450 to 550° C. for the mixed molten salt comprising silver chloride, for at most 10 to 60 days.

The present invention will be explained below in more detail by reference to the following Examples and Comparative Examples. However, the invention should not be construed as being limited to these Examples unless the invention departs from the spirit thereof.

EXAMPLE 1

A mixture of glass-forming materials having the composition shown in Table 1 was melted in a platinum crucible at 1,400° C., and the resulting melt was cast.

The glass thus obtained was evaluated for durability by a powder method which is a standard method adopted by the Optical Glass Industry Association of Japan. As a result, water resistance and acid resistance of the glass were rated as the first grade and the second grade, respectively. These results show that the glass having the recited composition had high weather resistance.

A plate having a size of 30×40×3.5 mm was cut out of the glass block obtained above. This plate was immersed for 29 days in a 400° C. mixed molten salt of 20 mol % $AgNO_3$ and 80 mol % $NaNO_3$ to produce a glass material for an axial refractive index distributed lens.

Figure 3:
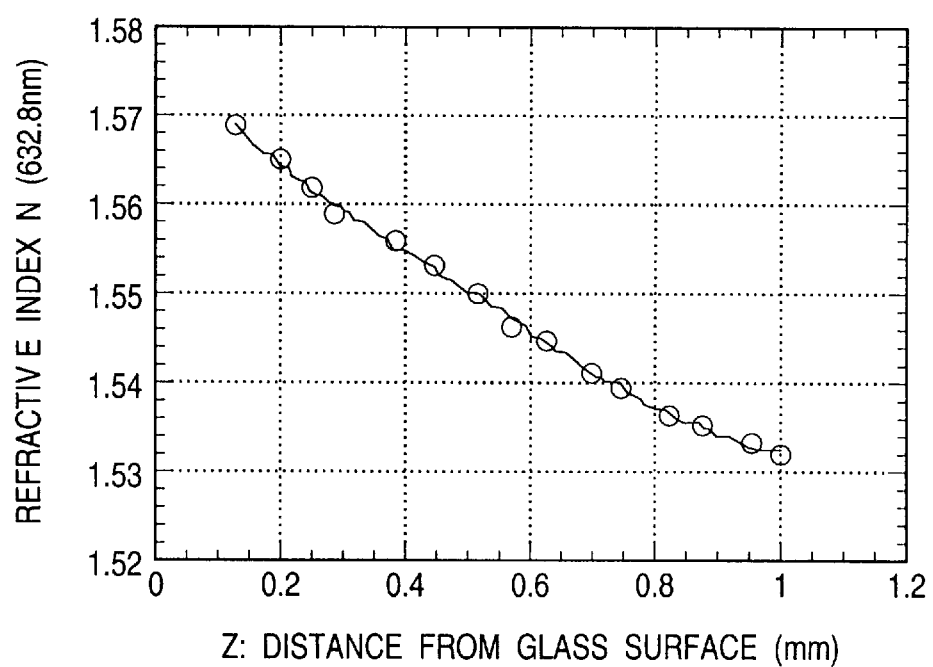
FIG. 3 is a graph showing the refractive index distribution in the glass obtained in Example 1 as a material for the axial refractive index distributed lens.

Refractive index distribution near the surface of this glass plate is shown in FIG. 3. The refractive index distribution almost coincided with the distribution of silver, and 1 mol % silver incorporated into the glass corresponded to a refractive index difference of 0.006. The refractive index distribution of the glass plate was approximately linear over the range of from the surface to a depth of about 0.8 mm, and was thus ascertained to be suitable for the correction of spherical aberration.

The following approximate expression was obtained from the refractive index distribution curve shown in FIG. 3. The measurement of refractive index was made at a wavelength of 632.8 nm.

$$N=1.58-0.1056z+0.1685z^2-0.1986z^3+0.0877z^4$$

(z represents a distance from the glass surface; unit, mm)

From the refractive index distribution approximation curve, a planoconvex condenser lens was designed such that the top of the convex surface corresponded to an inner point of the glass plate which was located at a depth of 0.15 mm from the surface of the ion-exchanged glass, and the lens had a thickness of 0.85 mm, an effective diameter of 6.0 mm, an outer diameter of 6.4 mm, and an R of the convex surface of 7.37 mm. This lens had a focal length of 12.99 mm and an F number of 2.17. As the result of the design, the RMS-OPD value of the on-axis focal image was 0.044ẽ. In this lens, spherical aberration had been corrected by the axial refractive index distribution, and the amount of aberration was not more than the diffraction limit (0.07ẽ).

EXAMPLES 2 AND 3

A mixture of glass-forming materials having the same composition as in Example 1 except that MgO was used in place of ZnO (Example 2) or ZnO and MgO were used in almost the same amount (Example 3) as shown in Table 1 was melted in a platinum crucible at 1,400° C., and the resulting melt was cast.

The glasses obtained were evaluated for durability by the powder method. As a result, the water resistance and acid resistance of each glass were rated as the first grade and the second grade, respectively.

Figure 4:
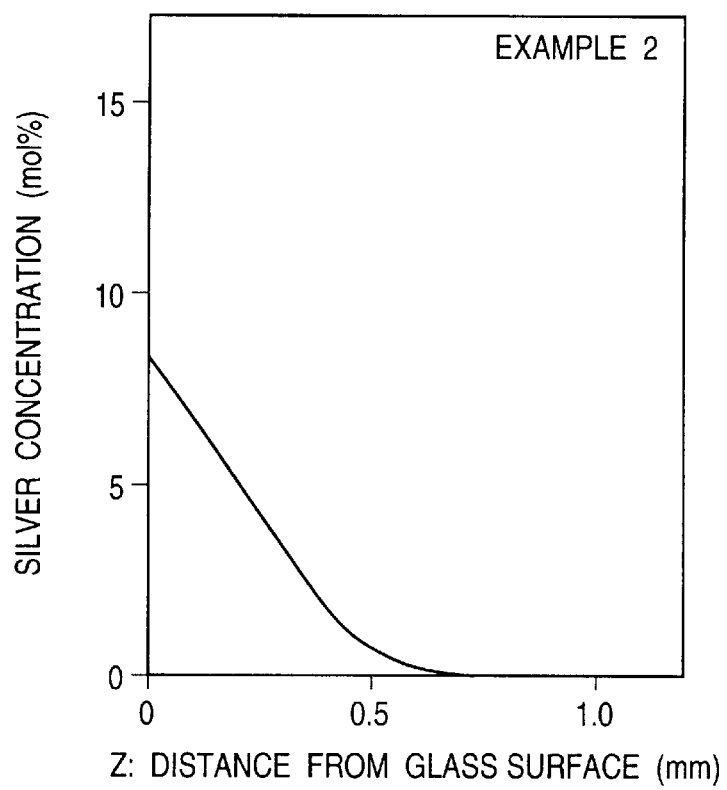
FIG. 4 is a graph showing a silver concentration distribution in the glass obtained in Example 2 as a material for the axial refractive index distributed lens.
Figure 5:
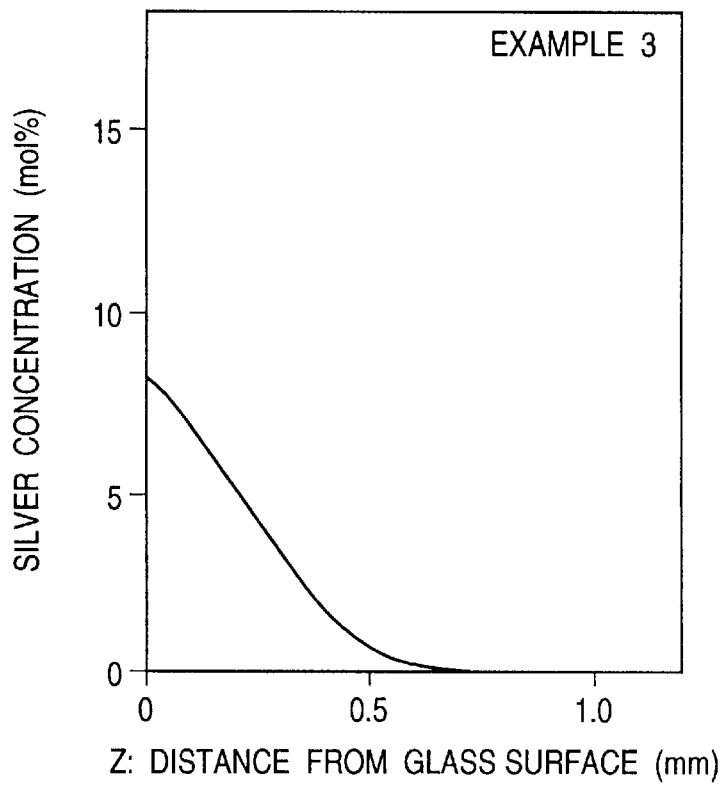
FIG. 5 is a graph showing a silver concentration distribution in the glass obtained in Example 3 as a material for the axial refractive index distributed lens.

A plate having a size of 30×40×3.5 mm was cut out of each glass block obtained above. These plates were immersed for 4 days in a 400° C. mixed molten salt of 20 mol % $AgNO_3$ and 80 mol % $NaNO_3$. The silver concentration distribution in surface part of the treated glasses is shown in FIGS. 4 and 5. The refractive index distribution determined through rough calculation from the silver concentration distribution shown in FIGS. 4 and 5 was approximately linear as in Example 1, and was thus ascertained to be suitable for the correction of spherical aberration.

EXAMPLE 4

A mixture of glass-forming materials having the same composition as in Example 1 except that the $Na_2O/Al_2O_3$ concentration ratio was changed as shown in Table 1 was melted in a platinum crucible at 1,400° C., and the resulting melt was cast.

The glass obtained was evaluated for durability by the powder method. As a result, the water resistance and acid resistance of the glass were rated both as the second grade.

Figure 6:
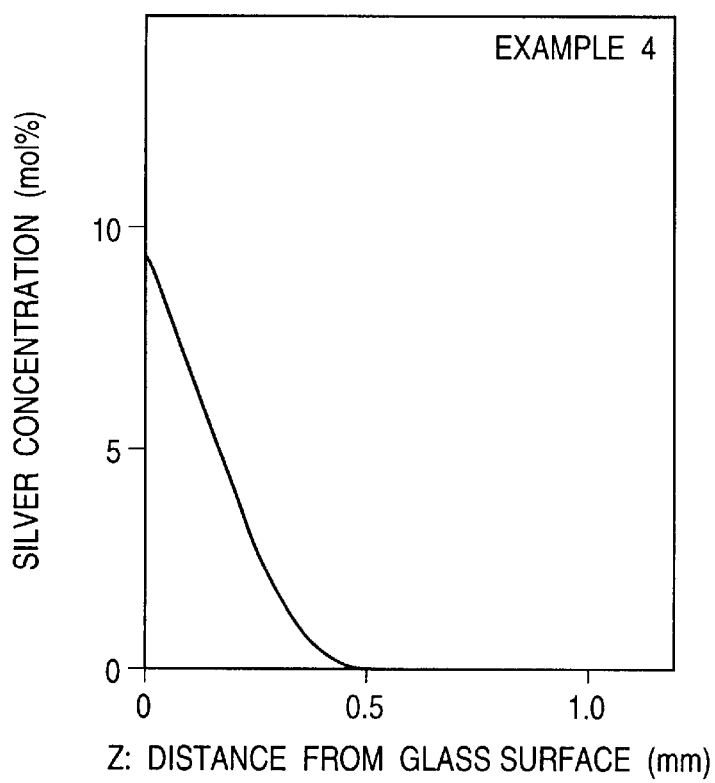
FIG. 6 is a graph showing a silver concentration distribution in the glass obtained in Example 4 as a material for the axial refractive index distributed lens.

A plate having a size of 30×40×3.5 mm was cut out of the glass block obtained above. The plate was immersed for 4 days in a 400° C. mixed molten salt of 20 mol % $AgNO_3$ and 80 mol % $NaNO_3$. The silver concentration distribution in a surface part of the treated glass is shown in FIG. 6. The refractive index distribution determined through rough calculation from the silver concentration distribution shown in FIG. 6 was approximately linear as in Example 1, and was thus ascertained to be suitable for the correction of spherical aberration.

EXAMPLES 5 TO 7

A mixture of glass-forming materials having the same composition as in Example 1 except that the $Na_2O/Al_2O_3$ concentration ratio was changed as shown in Table 1 was melted in a platinum crucible at 1,450° C., and the melt was cast.

The glasses obtained were evaluated for durability by the powder method. As a result, the water resistance and acid resistance of the glass obtained in Example 5 were rated as the first grade and the second grade, respectively, while the water resistance and acid resistance of each of the glasses obtained in Examples 6 and 7 were rated as the second grade and the third grade, respectively.

Figure 7:
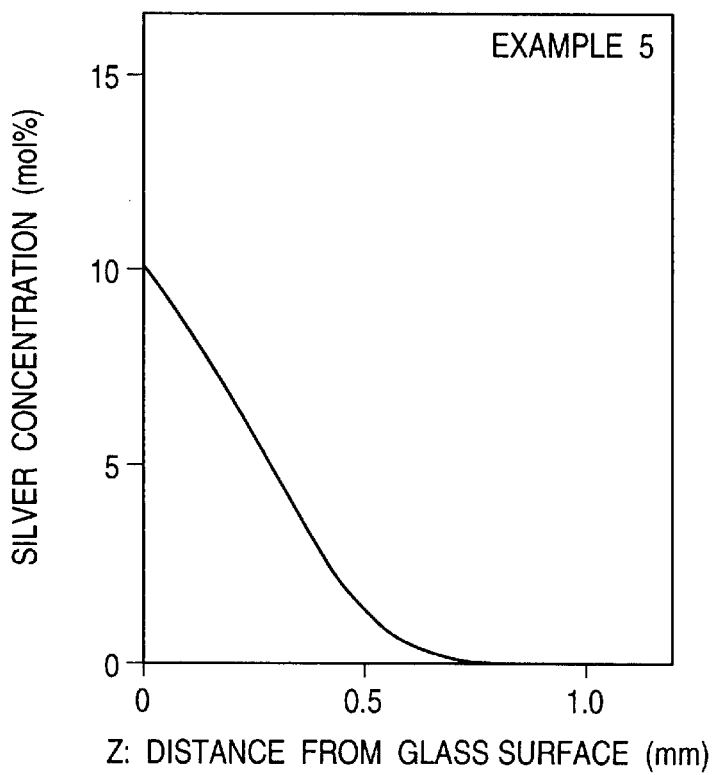
FIG. 7 is a graph showing a silver concentration distribution in the glass obtained in Example 5 as a material for the axial refractive index distributed lens.
Figure 8:
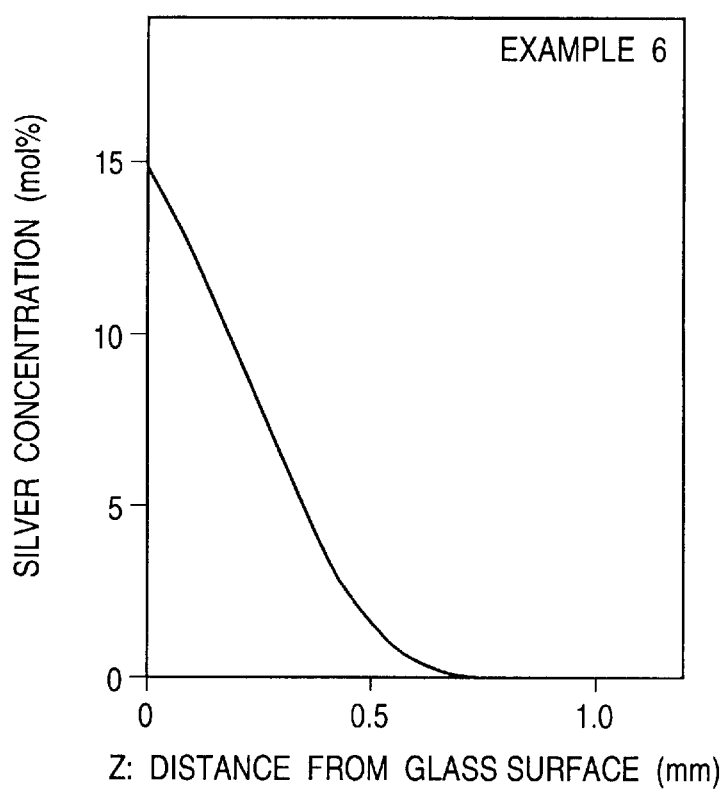
FIG. 8 is a graph showing a silver concentration distribution in the glass obtained in Example 6 as a material for the axial refractive index distributed lens.
Figure 9:
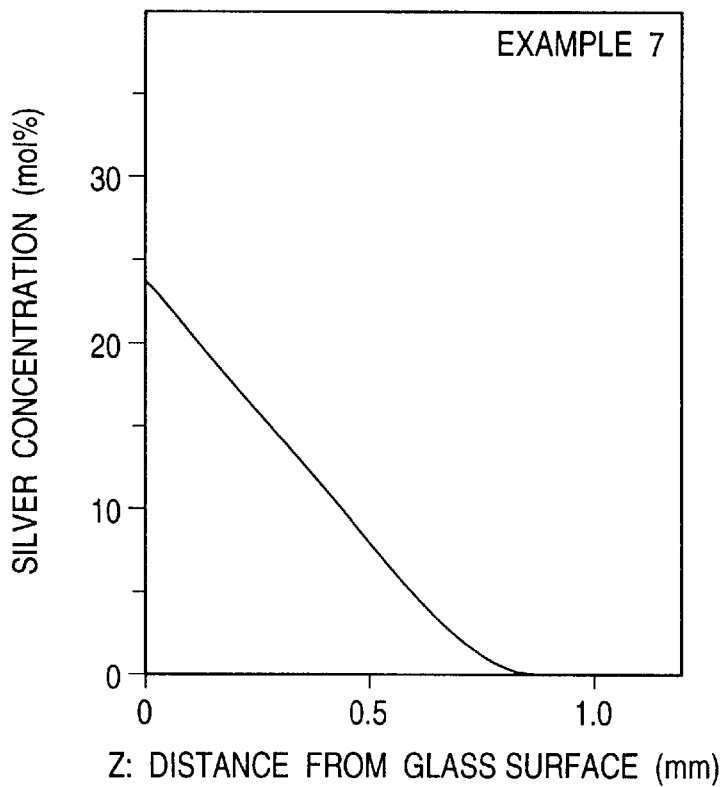
FIG. 9 is a graph showing a silver concentration distribution in the glass obtained in Example 7 as a material for the axial refractive index distributed lens.

A plate having a size of 30×40×3.5 mm was cut out of each glass block obtained above. These plates were immersed for 4 days in a 400° C. mixed molten salt of 20 mol % $AgNO_3$ and 80 mol % $NaNO_3$. The silver concentration distribution in surface part of the treated glasses is shown in FIGS. 7 to 9. The refractive index distribution determined through rough calculation from the silver concentration distribution shown in FIGS. 7 to 9 was approximately linear as in Example 1, and was thus ascertained to be suitable for the correction of spherical aberration.

EXAMPLE 8

A mixture of glass-forming materials having the same composition as in Example 1 except that $La_2O_3$ was added as a refractive index regulator (part of the ZnO was replaced with $La_2O_3$) as shown in Table 1 was melted in a platinum crucible at 1,400° C., and the melt was cast.

The glass obtained had a refractive index of 1.5317, which was higher by 0.018 than that of the glass obtained in Example 1.

The glass obtained was evaluated for durability by the powder method. As a result, the water resistance and acid resistance of the glass were rated as the first grade and the second grade, respectively.

Figure 10:
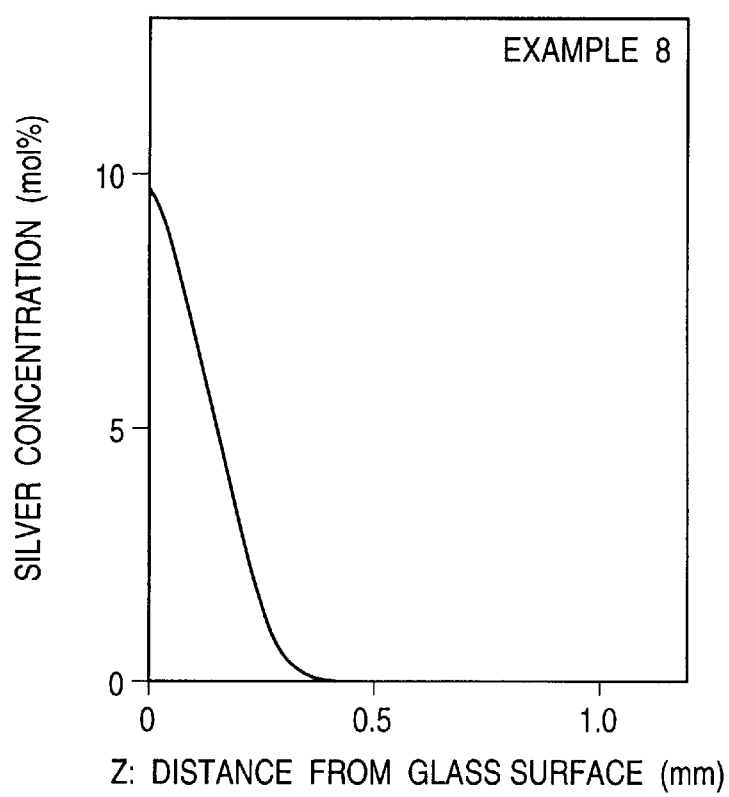
FIG. 10 is a graph showing a silver concentration distribution in the glass obtained in Example 8 as a material for the axial refractive index distributed lens.

A plate having a size of 30×40×3.5 mm was cut out of the glass block obtained above. The plate was immersed for 4 days in a 400° C. mixed molten salt of 20 mol % $AgNO_3$ and 80 mol % $NaNO_3$. The silver concentration distribution in a surface part of the treated glass is shown in FIG. 10. The refractive index distribution determined through rough calculation from the silver concentration distribution shown in FIG. 10 was approximately linear as in Example 1, and was thus ascertained to be suitable for the correction of spherical aberration.

EXAMPLES 9 AND 10

A mixture of glass-forming materials having the same composition as in Example 5 except that BaO or $Ta_2O_5$ was added as a refractive index regulator (part of the ZnO was replaced with BaO or $Ta_2O_5$) as shown in Table 1 was melted in a platinum crucible at 1,450° C., and the melt was cast.

The glasses obtained respectively had refractive indexes of 1.5168 and 1.5260, which were higher by 0.002 and 0.011 respectively than that of the glass obtained in Example 5.

The glasses obtained were evaluated for durability by the powder method. As a result, the water resistance and acid resistance of each glass were rated as the first grade and the second grade, respectively.

Figure 11:
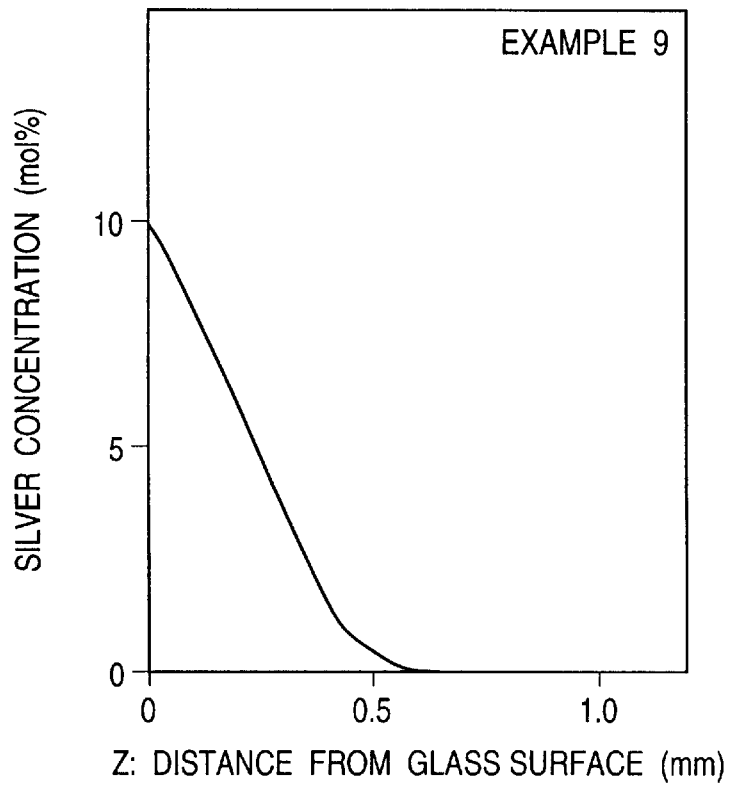
FIG. 11 is a graph showing a silver concentration distribution in the glass obtained in Example 9 as a material for the axial refractive index distributed lens.
Figure 12:
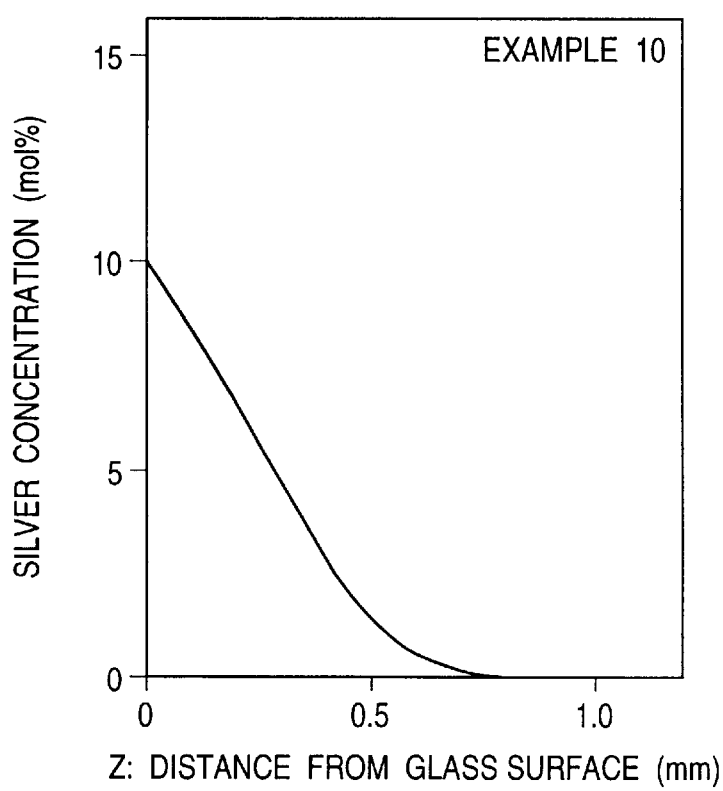
FIG. 12 is a graph showing a silver concentration distribution in the glass obtained in Example 10 as a material for the axial refractive index distributed lens.

A plate having a size of 30×40×3.5 mm was cut out of each glass block obtained above. These plates were immersed for 4 days in a 400° C. mixed molten salt of 20 mol % $AgNO_3$ and 80 mol % $NaNO_3$. The silver concentration distributions in surface part of the treated glasses are shown in FIGS. 11 and 12. The refractive index distributions determined through rough calculation from the silver concentration distributions shown in FIGS. 11 and 12 were approximately linear as in Example 1, and were thus ascertained to be suitable for the correction of spherical aberration.

EXAMPLE 11

A mixture of glass-forming materials having the same composition as in Example 1 except that $ZrO_2$ was added (part of the ZnO was replaced with $ZrO_2$) as shown in Table 1 was melted in a platinum crucible at 1,450° C., and the melt was cast.

The glass obtained was evaluated for durability by the powder method. As a result, the water resistance and acid resistance of the glass were rated both as the first grade, showing that this glass had improved durability as compared with the glass obtained in Example 1.

Figure 13:
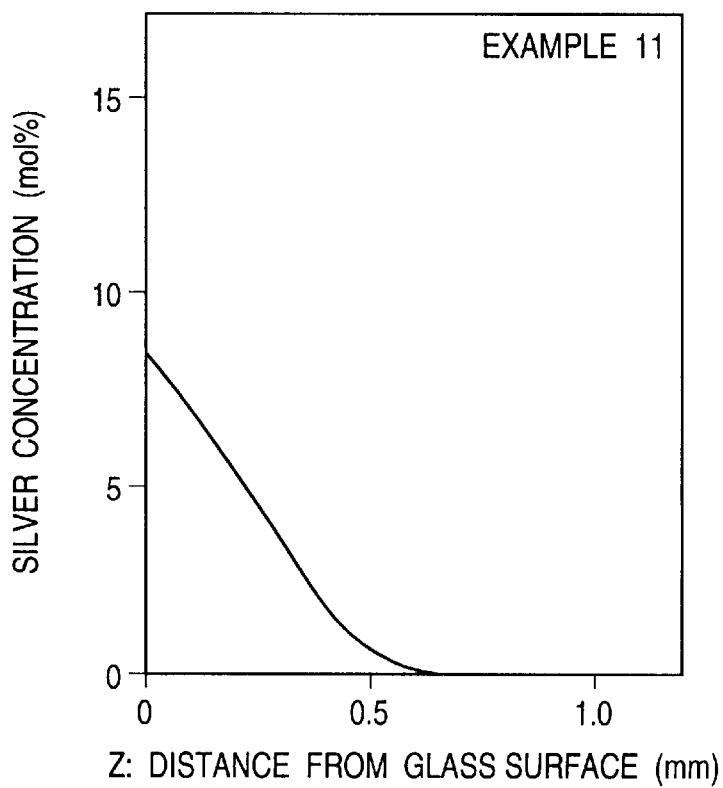
FIG. 13 is a graph showing a silver concentration distribution in the glass obtained in Example 11 as a material for the axial refractive index distributed lens.

A plate having a size of 30×40×3.5 mm was cut out of the glass block obtained above. The plate was immersed for 4 days in a 400° C. mixed molten salt of 20 mol % $AgNO_3$ and 80 mol % $NaNO_3$. The silver concentration distribution in a surface part of the treated glass is shown in FIG. 13. The refractive index distribution determined through rough calculation from the silver concentration distribution shown in FIG. 13 was approximately linear as in Example 1, and was thus ascertained to be suitable for the correction of spherical aberration.

COMPARATIVE EXAMPLE 1

A mixture of glass-forming materials having the composition shown in Table 1 was melted in a platinum crucible and then cast. The temperature required for this melting was 1,550° C., which was higher by 100 to 150° C. than those required in the Examples.

The glass obtained was evaluated for durability by the powder method. As a result, the water resistance and acid resistance thereof were rated both as the third grade, showing that this glass had lower durability than the glasses obtained in the Examples.

The results obtained are shown in Table 1. Table 1 also show results of the evaluation of suitability for the correction of spherical aberration (○=suitable, Δ=slightly unsuitable, ×=unsuitable) and the stability of $Ag^+$ (○=good, Δ=slightly poor, ×=poor).

TABLE 1

| Composition (mol %) | Example | | | | | | | | | | | Comp. Ex. |
|---|---|---|---|---|---|---|---|---|---|---|---|---|
| | 1 | 2 | 3 | 4 | 5 | 6 | 7 | 8 | 9 | 10 | 11 | 1 |
| $Na_2O$ | 12.5 | 12.5 | 12.5 | 12.5 | 15 | 18 | 25 | 12.5 | 15 | 15 | 12.5 | 25 |
| $Al_2O_3$ | 12.5 | 12.5 | 12.5 | 10 | 15 | 18 | 20 | 12.5 | 15 | 15 | 12.5 | 25 |
| MgO | | 12.5 | 6 | | 10 | | 5 | | 9 | 9 | | |
| ZnO | 12.5 | | 6.5 | 15 | | 7 | | 11.5 | | | 11.5 | |
| $B_2O_3$ | 12.5 | 12.5 | 12.5 | 12.5 | 12.5 | 12.5 | 12.5 | 12.5 | 12.5 | 12.5 | 12.5 | 12.5 |
| $SiO_2$ | 50 | 50 | 50 | 50 | 47.5 | 44.5 | 37.5 | 50 | 47.5 | 47.5 | 50 | 37.5 |
| $La_2O_3$ | | | | | | | | 1 | | | | |
| BaO | | | | | | | | | 1 | | | |
| $Ta_2O_5$ | | | | | | | | | | 1 | | |
| $ZrO_2$ | | | | | | | | | | | 1 | |
| Total | 100 | 100 | 100 | 100 | 100 | 100 | 100 | 100 | 100 | 100 | 100 | 100 |
| MgO + ZnO | 12.5 | 12.5 | 12.5 | 15 | 10 | 7 | 5 | 11.5 | 9 | 9 | 11.5 | 0 |
| $[Al_2O_3]/[Na_2O]$ | 1 | 1 | 1 | 0.8 | 1 | 1 | 0.8 | 1 | 1 | 1 | 1 | 1 |
| Durability Water resistance | 1st grade | 1st grade | 1st grade | 2nd grade | 1st grade | 2nd grade | 2nd grade | 1st grade | 1st grade | 1st grade | 1st grade | 3rd grade |
| Acid resist- | 2nd grade | 2nd grade | 2nd grade | 2nd grade | 2nd grade | 3rd grade | 3rd grade | 2nd grade | 2nd grade | 2nd grade | 1st grade | 3rd grade |

TABLE 1-continued

| Composition (mol %) | Example | | | | | | | | | | | Comp. Ex. |
|---|---|---|---|---|---|---|---|---|---|---|---|---|
| | 1 | 2 | 3 | 4 | 5 | 6 | 7 | 8 | 9 | 10 | 11 | 1 |
| ance | | | | | | | | | | | | |
| Melting temperature (° C.) | 1400 | 1400 | 1400 | 1400 | 1450 | 1450 | 1450 | 1460 | 1450 | 1450 | 1450 | 1550 |
| Suitability for compensation of spherical aberration | ○ | ○ | ○ | ○ | ○ | ○ | ○ | ○ | ○ | ○ | ○ | x |
| Stability of Ag$^+$ | ○ | ○ | ○ | ○ | ○ | ○ | ○ | ○ | ○ | ○ | ○ | x |

EXAMPLES 12 TO 21 AND COMPARATIVE EXAMPLES 2 AND 3

Glasses respectively obtained using the glass compositions shown in Table 2 were examined for weather resistance, melting temperature, suitability for the compensation of spherical aberration based on refractive index distribution, and the stability of Ag$^+$ in the same manner as in Example 2. The results obtained are shown in Table 2.

ent to one skilled in the art that various changes and modifications can be made therein without departing from the spirit and scope thereof.

What is claimed is:

1. An axial refractive index distributed lens obtained by forming in a glass material, a refractive index distribution in the direction of the optical axis thereof by an ion exchange method using silver,

TABLE 2

| Composition (mol %) | Example | | | | | | | | | | Comp. Ex. | |
|---|---|---|---|---|---|---|---|---|---|---|---|---|
| | 12 | 13 | 14 | 15 | 16 | 17 | 18 | 19 | 20 | 21 | 2 | 3 |
| Na$_2$O | 11 | 20 | 11 | 16.5 | 16 | 12.5 | 12.5 | 17 | 14 | 13 | 16 | 11 |
| Al$_2$O$_3$ | 12.5 | 16 | 9 | 16.5 | 16 | 12.5 | 12.5 | 17 | 10 | 17 | 16 | 10 |
| MgO | | | | | 4 | | 14 | 5 | | | | |
| ZnO | 12.5 | 10 | 12.5 | 2.5 | | 17 | | 5 | 12.5 | 10 | 2 | 20 |
| B$_2$O$_3$ | 12.5 | 10 | 15 | 12.5 | 12.5 | 7 | 10 | 4 | 12.5 | 12.5 | 12.5 | 8 |
| SiO$_2$ | 51.5 | 44 | 52.5 | 52 | 51.5 | 51 | 51 | 52 | 51 | 47.5 | 53.5 | 51 |
| La$_2$O$_3$ | | | | | | | | | | | | |
| BaO | | | | | | | | | | | | |
| Ta$_2$O$_5$ | | | | | | | | | | | | |
| ZrO$_2$ | | | | | | | | | | | | |
| Total | 100 | 100 | 100 | 100 | 100 | 100 | 100 | 100 | 100 | 100 | 100 | 100 |
| MgO + ZnO | 12.5 | 10 | 12.5 | 2.5 | 4 | 17 | 14 | 10 | 12.5 | 10 | 2 | 20 |
| [Al$_2$O$_3$]/[Na$_2$O] | 1.1 | 0.8 | 0.8 | 1 | 1 | 1 | 1 | 1 | 0.7 | 1.3 | 1 | 0.9 |
| Durability Water resistance | 1 | 2 | 2 | 2 | 2 | 2 | 1 | 2 | 2 | 2 | 2 | 3 |
| Acid resist- | 2 | 3 | 2 | 2 | 2 | 2 | 2 | 3 | 2 | 2 | 3 | 3 |
| Melting temperature (° C.) | 1450 | 1400 | 1400 | 1500 | 1500 | 1400 | 1400 | 1450 | 1400 | 1500 | 1550 | 1450 |
| Suitability for compensation of spherical aberration | ○ | ○ | ○ | ○ | ○ | ○ | ○ | ○ | ○ | ○ | ○ | Δ |
| Stability of Ag$^+$ | ○ | ○ | ○ | ○ | ○ | ○ | ○ | ○ | Δ | ○ | ○ | x |

As explained above, according to the present invention, the axial refractive index distributed lens having high quality and high properties is provided from a glass material which has a refractive index distribution required for an optical design, high durability, a low melting temperature and an ion exchange rate sufficient for practical use and is capable of allowing silver ions to be stably present therein, by incorporating ZnO and MgO in given proportions into an aluminoborosilicate glass.

The axial refractive index distributed lens of the present invention can be used not only as piano-convex spherical lenses such as that shown in the Examples described above, but also in a wide range of various optical systems including camera lenses, oculars, and microscopes.

While the invention has been described in detail and with reference to specific embodiments thereof, it will be apparsaid glass material comprising a glass composition having the following composition:

$10 < Na_2O \leq 25$ mol %

$8 < Al_2O_3 \leq 25$ mol %

$0 \leq MgO \leq 18$ mol %

$0 \leq ZnO \leq 18$ mol %

$7 \leq B_2O_3 \leq 18$ mol %

$35 \leq SiO_2 \leq 55$ mol %

$0 \leq La_2O_3 \leq 5$ mol %

$0 \leq BaO \leq 5$ mol %

$0 \leq Ta_2O_5 \leq 3$ mol %

$0 \leq ZrO_2 \leq 3$ mol % provided that 2.5 ≦ MgO+ZnO ≦ 18 mol %.

2. The axial refractive index distributed lens of claim 1, wherein the glass composition has the following composition:

12.5 ≦ $Na_2O$ ≦ 25 mol %
10 ≦ $Al_2O_3$ ≦ 22 mol %
0 ≦ MgO ≦ 15 mol %
0 ≦ ZnO ≦ 15 mol %
7 ≦ $B_2O_3$ ≦ 16 mol %
40 ≦ $SiO_2$ ≦ 55 mol %
0 ≦ $La_2O_3$ ≦ 3 mol %
0 ≦ BaO ≦ 3 mol %
0 ≦ $Ta_2O_5$ ≦ 3 mol %
0 ≦ $ZrO_2$ ≦ 3 mol % provided that

3 ≦ MgO+ZnO ≦ 15 mol %.

3. The axial refractive index distributed lens of claim 2, wherein the glass composition has the following composition:

12.5 ≦ $Na_2O$ ≦ 18 mol %
12.5 ≦ $Al_2O_3$ ≦ 18 mol %
0 ≦ MgO ≦ 12.5 mol %
0 ≦ ZnO ≦ 12.5 mol %
7 ≦ $B_2O_3$ ≦ 15 mol %
42.5 ≦ $SiO_2$ ≦ 52.5 mol %
0 ≦ $La_2O_3$ ≦ 3 mol %
0 ≦ BaO ≦ 3 mol %
0 ≦ $Ta_2O_5$ ≦ 3 mol %
0 ≦ $ZrO_2$ ≦ 3 mol % provided that

5 ≦ MgO+ZnO ≦ 12.5 mol %.

4. The axial refractive index distributed lens of claim 1, wherein in the glass composition has a ratio of the concentration of $Al_2O_3$ to that of $Na_2O$, $[Al_2O_3]/[Na_2O]$, of 0.8 to 1.2.

5. The axial refractive index distributed lens of claim 1, wherein the glass material is produced by subjecting the glass material to ion exchange by immersing the glass material in a molten salt to diffuse silver ions into the glass material to thereby form a refractive index distribution, cutting the glass material into a blank, and then grinding and polishing the blank.

6. The axial refractive index distributed lens of claim 5, wherein the molten salt includes a mixed molten salt of 5 to 30 mol % silver nitrate and 95 to 70 mol % sodium nitrate.

7. The axial refractive index distributed lens of claim 5, wherein the molten salt includes a mixed molten salt of 50 to 100 mol % silver chloride, 0 to 50 mol % zinc chloride, and 0 to 30 mol % silver sulfide.

* * * * *